United States Patent [19]

Seto

[11] Patent Number: 4,879,598
[45] Date of Patent: Nov. 7, 1989

[54] INFRARED VIDEO CAMERA SHADING CORRECTION DEVICE

[75] Inventor: Toshiki Seto, Kanagawa, Japan

[73] Assignee: Mitsubishi Denki K.K., Tokyo, Japan

[21] Appl. No.: 276,893

[22] Filed: Nov. 28, 1988

[30] Foreign Application Priority Data

Jan. 22, 1988 [JP] Japan .................................. 63-12035

[51] Int. Cl.⁴ .......................... H04N 5/33; H04N 5/14
[52] U.S. Cl. ...................................... 358/113; 358/163
[58] Field of Search .................... 358/113, 163, 213.15, 358/213.16, 213.17, 213.18, 213.19, 213.24, 213.27, 284; 382/50, 52, 54

[56] References Cited

U.S. PATENT DOCUMENTS

| | | | |
|---|---|---|---|
| 4,288,817 | 9/1981 | Igel | 358/163 |
| 4,520,395 | 5/1985 | Abe | 358/163 |
| 4,524,388 | 6/1985 | Abe et al. | 358/163 |
| 4,554,583 | 11/1985 | Saitoh et al. | 358/163 |
| 4,618,892 | 10/1986 | Kawaguchi | 358/113 |

FOREIGN PATENT DOCUMENTS

| | | | |
|---|---|---|---|
| 0087971 | 5/1983 | Japan | 358/163 |
| 58-209274 | 12/1983 | Japan | |
| 0046077 | 2/1988 | Japan | |

Primary Examiner—John W. Shepperd
Assistant Examiner—Michael D. Parker
Attorney, Agent, or Firm—Takeuchi Patent Office

[57] ABSTRACT

An infrared video camera shading correction device which includes an averaging circuit for averaging during a few frames the output of an infrared image sensor to provide an average output, a shading pattern generator for generating a shading pattern similar to that of an optics of the infrared video camera, a multiplier for multiplying the average output by the shading pattern signal to provide a multiplication output, and a subtractor for subtracting the multiplication output from the infrared video signal of the infrared image pickup section for effecting shading correction.

2 Claims, 5 Drawing Sheets

FIG. 3
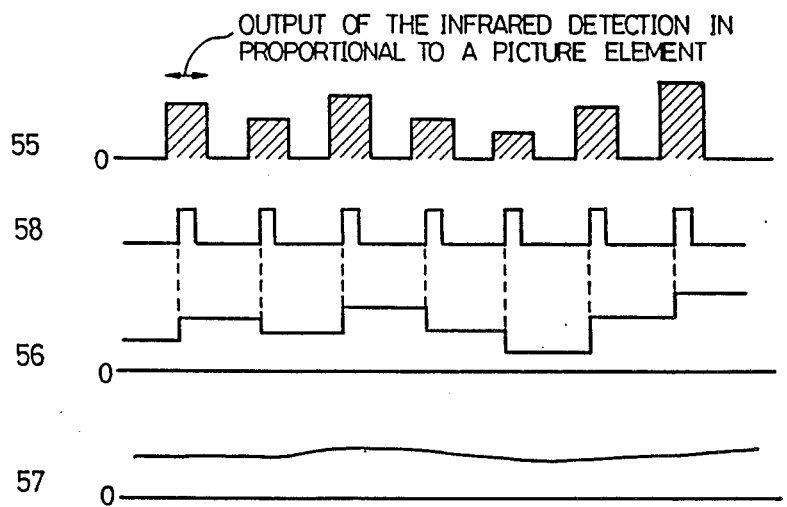
FIG. 4
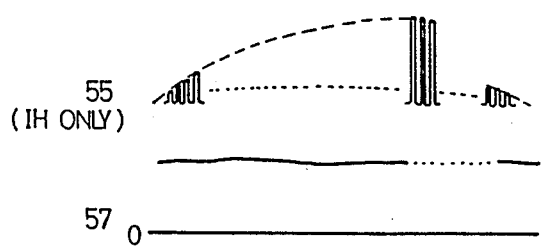
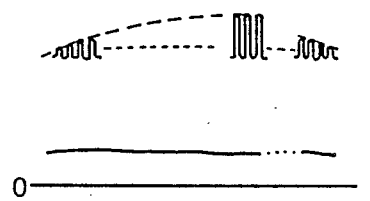
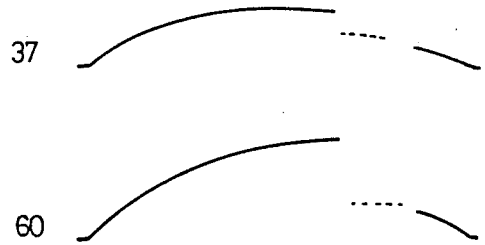
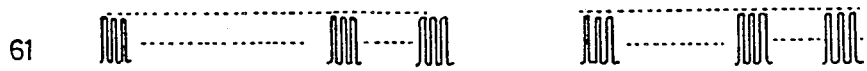

FIG. 9 (a) PRIOR ART
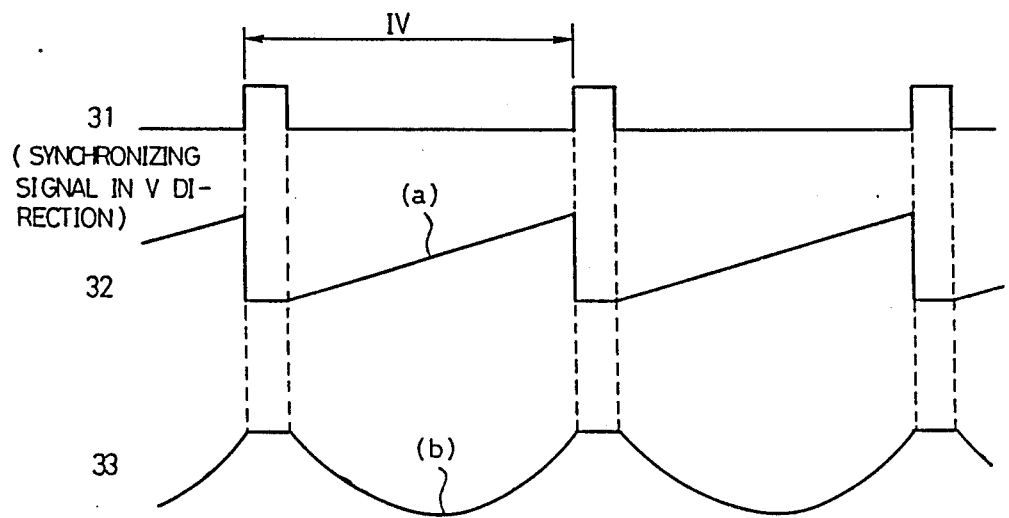
FIG. 9 (b) PRIOR ART
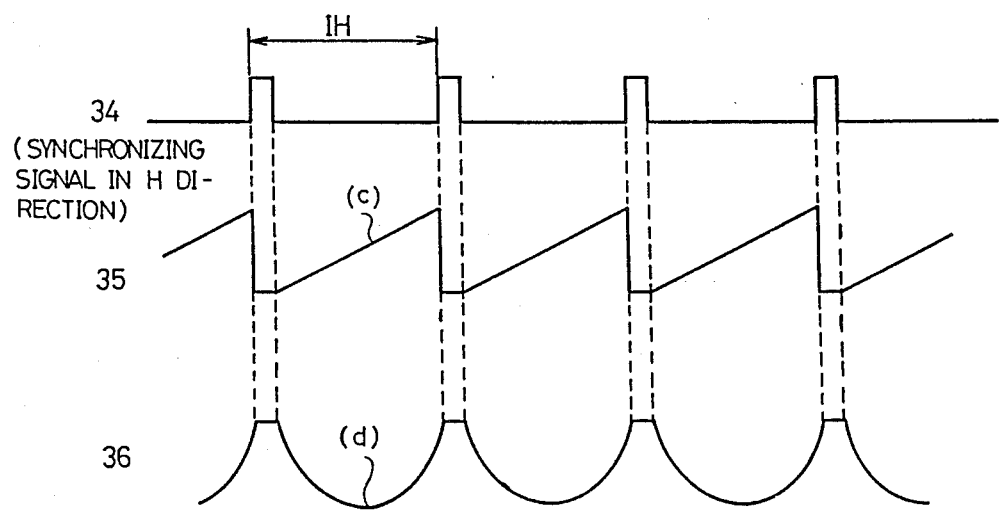
FIG. 9 (c) PRIOR ART
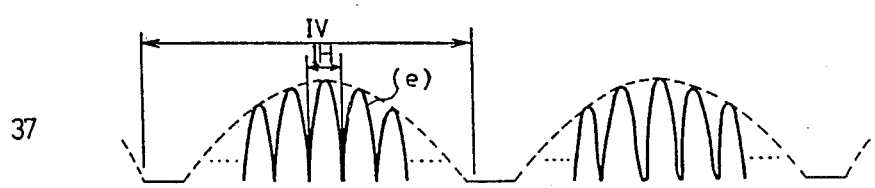
(e): SECOND-DEGREE PARABOLIC WAVEFORM

INFRARED VIDEO CAMERA SHADING CORRECTION DEVICE

BACKGROUND OF THE INVENTION

The present invention relates to a device for electrically correcting a shading or difference in infrared light quantity between the center and the periphery detector on an image sensor in the optical system of an infrared video camera.

FIGS. 5 and 6 show how a shading is produced in an infrared video camera. Designated at 1 is a lens, at 2 an infrared image sensor, such as an infrared charge coupled device (IRCCD), at 3 a cold shield for cutting off undesired infrared radiation, at 4 infrared rays falling upon the infrared image sensor 2, at 5 infrared rays passing through the lens 1, and at 6 infrared rays coming from the interior of an infrared video camera other than through the lens 1.

The cold shield 3 is cooled along with the infrared image sensor 2 to temperatures so low that the infrared emission from it is negligible. If the shading caused by the lens 1 is sufficiently small to neglect, a cause for producing a shading is a difference in intensity of the infrared rays 6 between the center and the periphery of the infrared image sensor 2. As is well known, the intensity is proportional to $\cos^4 \theta$ wherein $\theta$ is the incident angle of an infrared ray so that as is apparent from the figure, the intensity is higher in the center than in the periphery. Consequently, a positive shading effect is added to the output from the center of the infrared image sensor 2 regardless of the intensity of infrared rays 5 passing through the lens 1.

Where the lens 1 produces a considerably shading, there is a difference in intensity of the infrared rays 5 between the center and the periphery of the infrared image sensor 2. This difference is added to the above shading of the infrared rays 6. The magnitudes of the shading of the infrared rays 5 and 6 are determined by the quantity of infrared rays passing through the lens 1 from the outside and the temperature of the interior of an infrared video camera, respectively.

FIG. 7 shows a conventional device for correcting a shading in an infrared video camera. Denoted at 1 is a lens, at 7 an infrared detector, at 8 a shading pattern generator, and at 9 a subtractor. As described above in FIGS. 5 and 6, the output 55 of the infrared detector 7 is higher in the center than in the periphery of the image sensor because of the positive shading.

FIG. 8 shows a shading pattern generator 8a where the shading pattern produced in an infrared video camera is approximately by a two dimensional parabolic curve base on the fact that the shading pattern caused by a lens is generally approximated by a two dimensional parabolic curve which is symmetric about the optical axis. A parabolic waveform made in the vertical direction of a screen is multiplied by that of the horizontal direction to form a two dimensional parabolic waveform.

An integrating circuit 20 using an operational amplifier 22, to which a negative voltage ($-V$) is input, is reset every time a switch circuit 23 is switched in response to a synchronizing signal 31 in the vertical direction so that the output 32 of the integrating circuit 20 becomes a sawtooth waveform (a) as shown in FIG. 9(a). This sawtooth wave 32 is input to X and Y inputs of an analog multiplier 24 to provide at output 33 a parabolic waveform (b) in the vertical direction.

Similarly, in response to a synchronizing signal 34 in the horizontal direction, a switching circuit 28 of an integrating circuit 25, which includes an operational amplifier 27, switches to form a sawtooth wave (c) at output 35 in FIG. 9(b). This sawtooth 35 is input to an analog multiplier 29 to provide at output 36 a parabolic wave (d) in the horizontal direction. Finally, the vertical and horizontal parabolic waves (b) and (d) are input to an analog multiplier 30 to provide at output 37 a two dimensional parabolic wave (e) in FIG. 9(c).

FIG. 10 shows a shading pattern generator 8b where a shading caused in an infrared video camera takes a given shape. An address signal 42 represents coordinates in the vertical and horizontal directions. A shading pattern memory 40 has stored coordinates corresponding to shading quantities in the vertical and horizontal directions. In response to a coordinate address signal 42 corresponding to an output signal of the infrared detector 7, the shading pattern memory 40 outputs shading data 43. This shading data 43 is converted to a shading pattern analog data 44 by a D/A converter 41.

In the above infrared video camera shading correction device, the subtraction correction is carried out on the assumption of a fixed shading pattern. However, when the inside temperature of an infrared video camera changes under an influence of the varying outside temperature, etc., or when the average intensity of infrared rays from an object changes considerably, it is apparent from the above shading principle that the magnitude of shading also changes, bringing with it an error in the shading correction.

SUMMARY OF THE INVENTION

Accordingly, it is an object of the invention to provide an infrared video camera shading correction device which is capable of maintaining a right shading correction even if the inside temperature of an infrared video camera changes for some causes or the average level of infrared rays from an object changes considerably.

According to the invention there is provided a device for correcting shading in an infrared video camera including an optical section and an infrared image pickup section, which includes an averaging circuit for averaging during a few frames an output of the infrared image pickup section to provide an average output; a shading pattern generator for generating a shading pattern signal similar to that of the optical section; a multiplier for multiplying the average output by the shading pattern signal to provide a multiplication output; a subtractor for the multiplication output from an output of the image pickup section.

The above and other objects, features, and advantages of the invention will become more apparent from the following description when taken in conjunction with the accompanying drawings.

BRIEF DESCRIPTION OF THE DRAWINGS

FIG. 3 is a graph showing input and output waveforms at respective points in the averaging circuit of FIG. 2;

FIG. 4 is a graph showing output waveforms at respective points in FIG. 1;

FIGS. 9(a), (b), and (c) are graphs showing output waveforms of the shading pattern generator of FIG. 8.

DESCRIPTION OF THE PREFERRED EMBODIMENT

Figure 1:
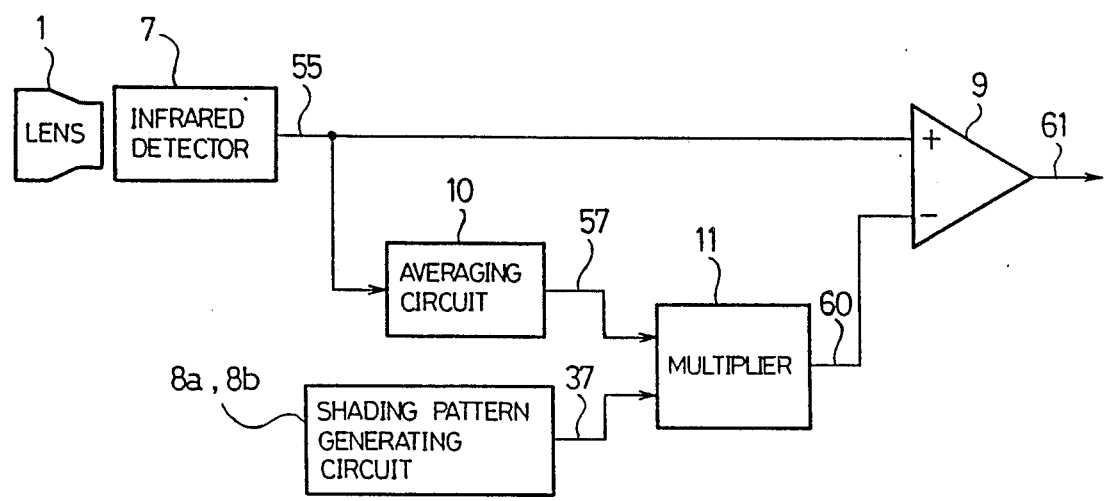
FIG. 1 is a block diagram of an infrared video camera shading correction device according to an embodiment of the invention.

FIG. 1 shows an infrared video camera shading correction device which includes an averaging circuit 10 and a multiplier 11. The lens 1, infrared detector 7, and shading pattern generator 8 operate in the same way as those of a conventional device. The averaging circuit 10 receives an output 55 of the infrared detector 7 to provide an output averaged in the period of a few frames.

Figure 2:
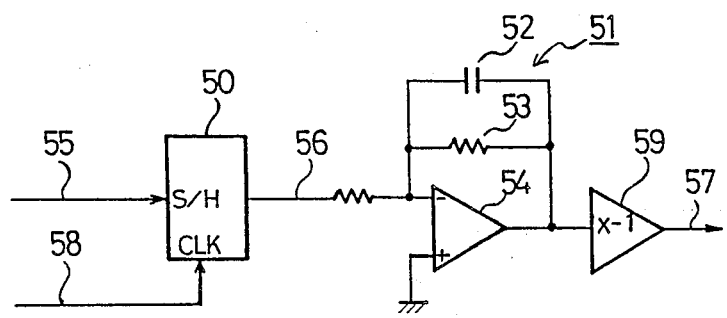
FIG. 2 is a schematic diagram of an averaging circuit useful for the device of FIG. 1.
Figure 7:
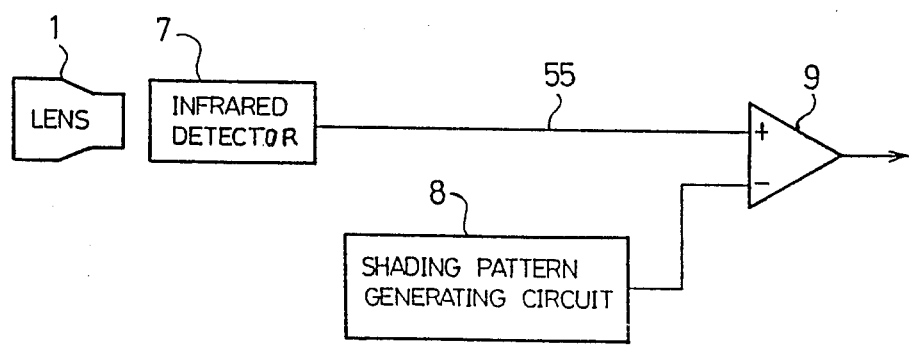
FIG. 7 is a block diagram of a conventional infrared video camera shading correction device.
Figure 5:
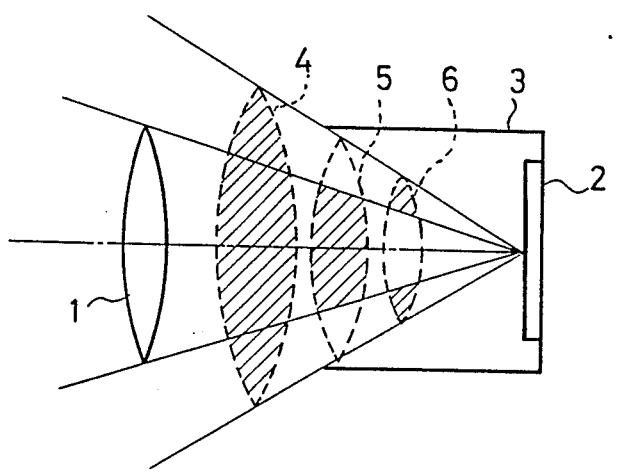
FIGS. 5 and 6 show how a shading is produced.
Figure 6:
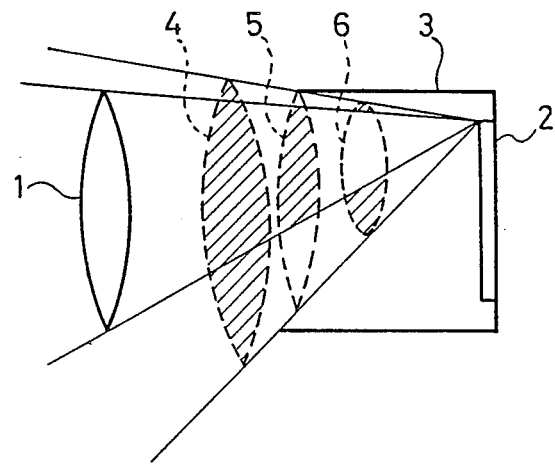
Figure 8:
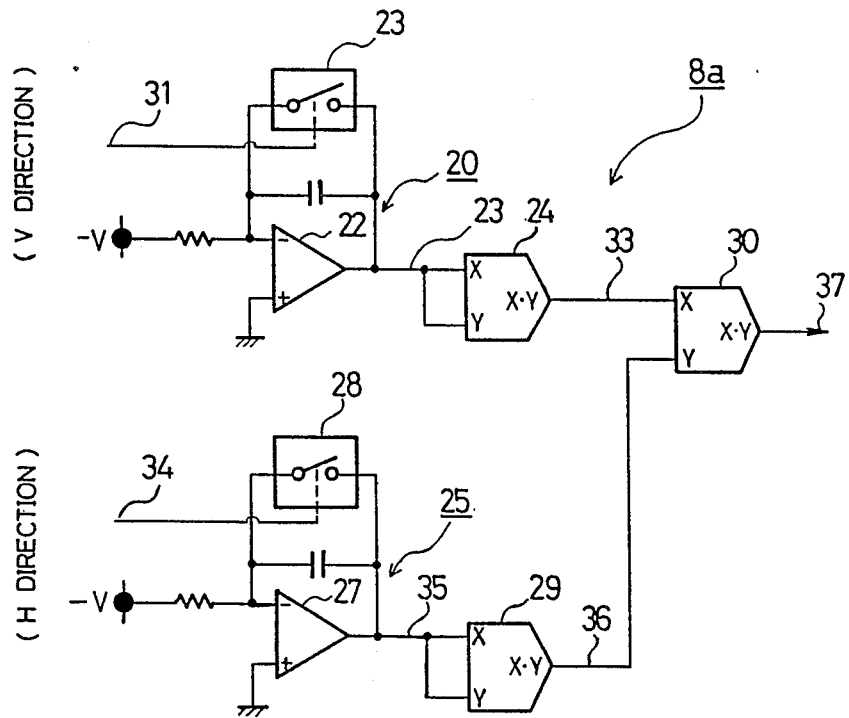
FIG. 8 is a schematic diagram of a shading pattern generator according to the prior art.
Figure 10:
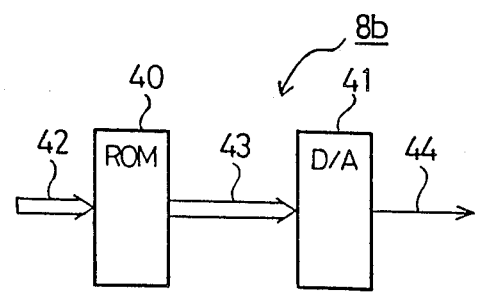
FIG. 10 is a block diagram of another shading pattern generator according to the prior art.

FIG. 2 shows the averaging circuit 10 in more detail. As shown in FIG. 3, the output 55 of the infrared detector 7 is a pulse signal in which the height of each pulse is proportional to the amount of incident infrared radiation per pixed. In response to a sample and hold (S/H) control signal 58, a sample hold circuit 50 outputs an S/H signal 56.

A time constant circuit 51 including an operational amplifier 54 amplifies the S/H output 56 with a certain time constant. The time constant is determined by a capacitor 52 and a resistor 53. When this time constant is set at a time period equal to the duration of a few frames in the infrared video camera, the output 57 of the time constant circuit 51 can be approximated by an average value in the period of a few frames of the S/H output 56. A (−1) time operational amplifier 59 is provided to match polarity.

FIG. 4 show the output waveforms 55 of the infrared detector 7, output waveforms 57 of the time constant circuit 51, output waveforms 37 of the shading pattern generator 8, output waveforms 60 of the multiplier 11, and output waveforms 61 with shading corrected with respect to high and low outpus levels in the horizontal direction.

When the inside temperature of an infrared video camera changes under an influence of the changing outside temperatue, etc. or when the average level of infrared emission from a new object is considerably different from that of a previous object, the magnitude of shading varies substantially proportionally with the output of the infrared detector 7.

According to the invention, the average output of the infrared detector 7 is determined by the averaging circuit 10. This output is multiplied by that of the shading pattern generator 8 in the multiplier 11. The output of the multiplier 11 is subtracted from the output of the infrared detector 7 in the subtractor 9 to effect shading correction without errors.

Even if the image of a fine object at an extremely high or low temperature is picked up, the averaging circuit 10 determines the average output of a few frames so that this fine object does not inappropriately alter the magnitude of a correction shading pattern.

As has been described above, according to the invention, the magnitude of a correction pattern is controlled by the average output of the infrared detector so that even if the inside temperature of an infrared video camera changes or the average level of infrared emission from the object changes, it is possible to provide shading correction without errors.

While a preferred embodiment of the invention has been described using specific terms, such description is for explanatory purposes only, and it is to be understood that changes and variations may be made without departing from the spirit and scope of the invention as recited in the following claims.

What is claimed is:

1. A device for correcting a shading in an infrared video camera including an optical section and an infrared image pickup section, which comprises:

an averaging circuit for averaging during a few frames an output of said infrared image pickup section to provide an average output;

a shading pattern generator for generating a shading pattern signal similar to that of said optical section;

a multiplier for multiplying said average output by said shading pattern signal to provide a multiplication output; and a subtractor for subtracting said multiplication output from an infrared video output of said image pickup section.

2. The device of claim 1, wherein said averaging circuit comprises a time constant circuit having a time constant equal to a period of a few frames.

* * * * *